United States Patent Office 3,011,853
Patented Dec. 5, 1961

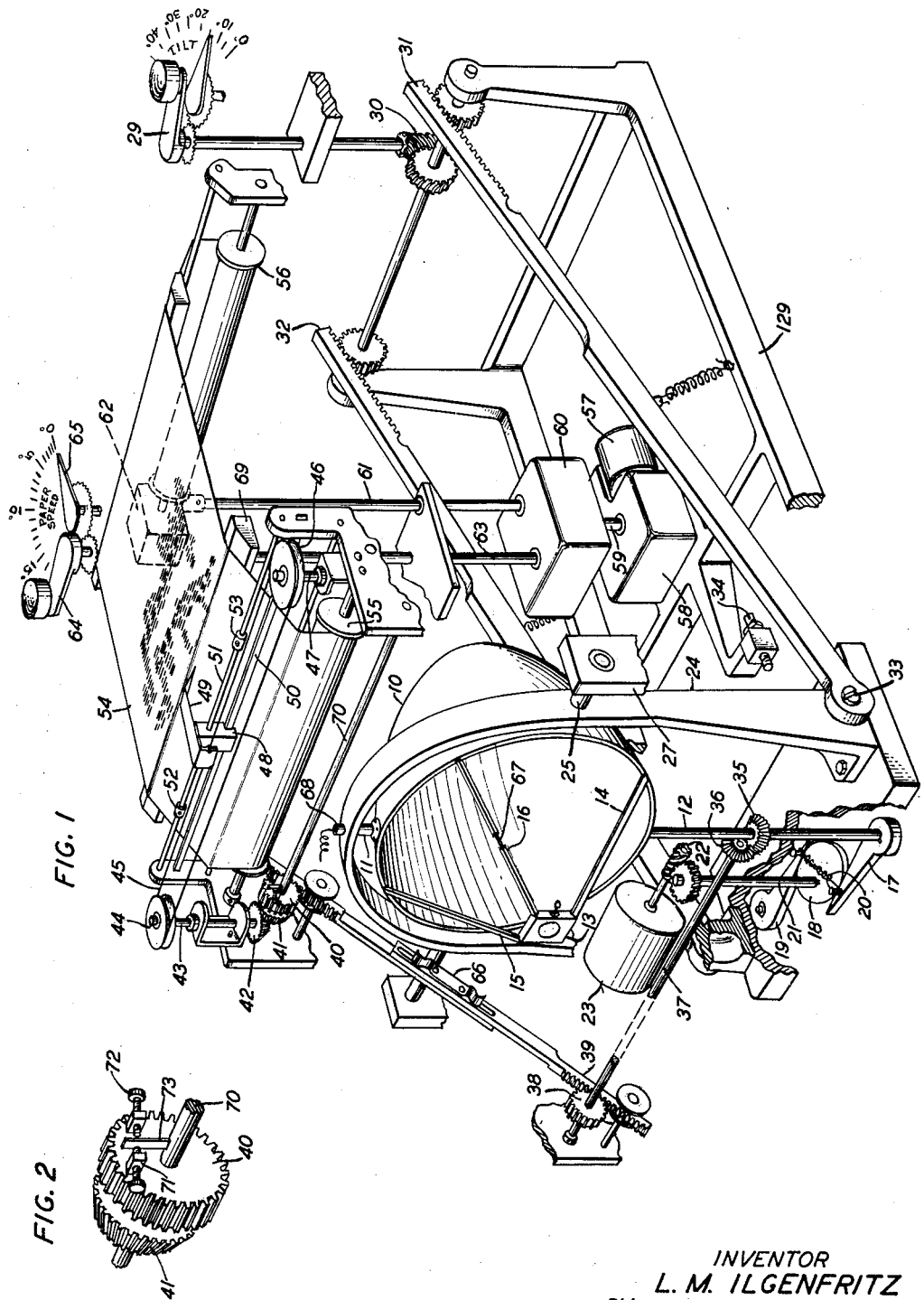

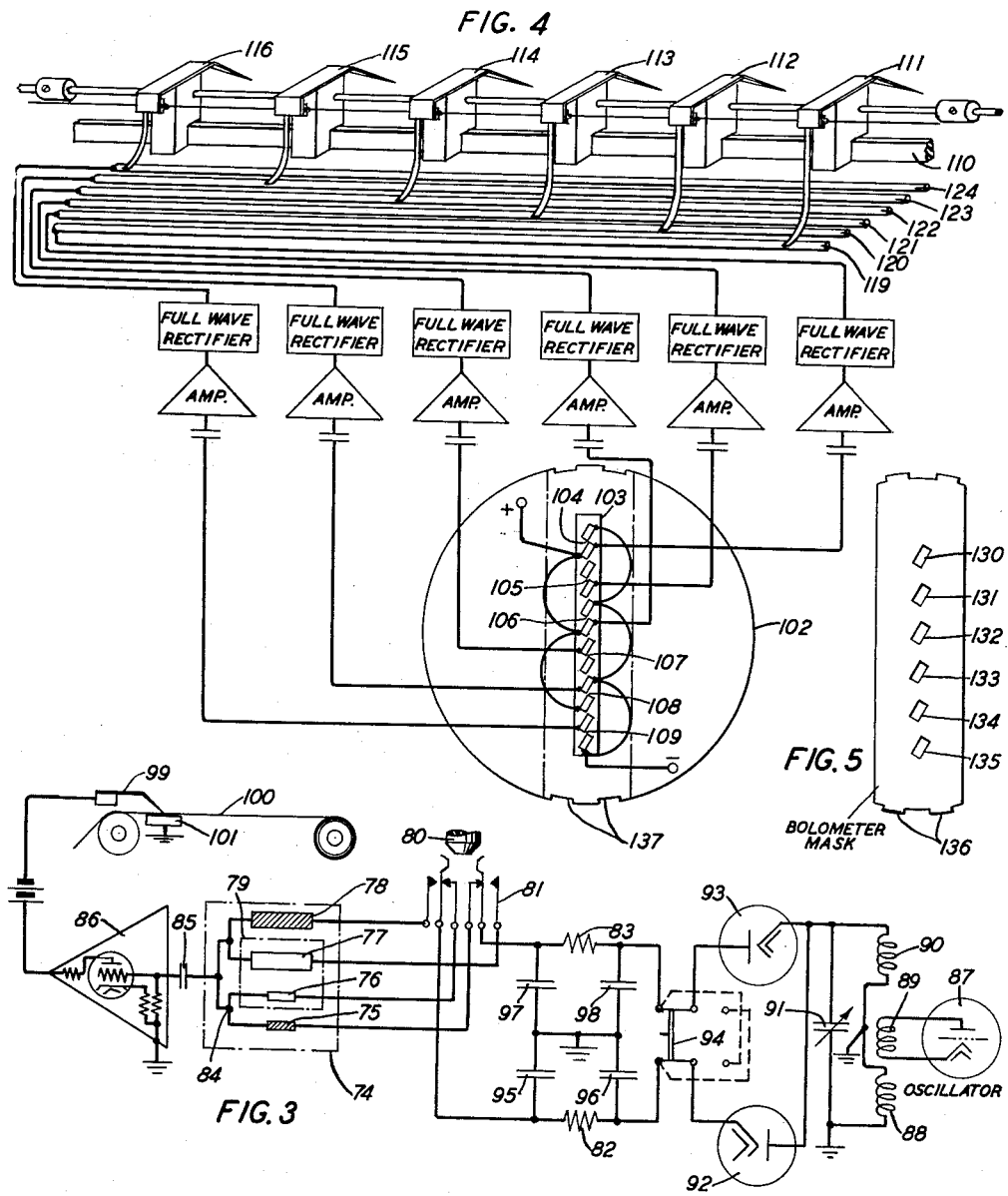

3,011,853
SYSTEM FOR DETECTING AND RECORDING
TEMPERATURE DIFFERENTIALS
Lester M. Ilgenfritz, Mamaroneck, N.Y., assignor to Bell
Telephone Laboratories, Incorporated, New York, N.Y.,
a corporation of New York
Filed Oct. 2, 1947, Ser. No. 777,467
4 Claims. (Cl. 346—8)

This invention relates to systems for detecting and locating thermal-energy sources and particularly to a system for plotting a strip-map of temperature differentials and discontinuities encountered in an area of scan.

An object of the invention is to obtain a strip-map of heat sources and temperature discontinuities.

Another object is to obtain the efficient recording of thermal-energy emissions.

A further object is to detect and record the positions and bearings of thermal-energy sources at an increased speed.

A still further object is to plot the course of a heat source such as a robot missile.

Other objects of the invention will be apparent from a study of the specifications and accompanying drawings.

The equipment according to the preferred form of the invention is a self-contained compact unit which utilizes radiations emanating from objects and areas to plot a continuous strip-map of the size and the relative positions occupied by said objects and areas. The radiations utilized by the equipment may fall within the ultra-violet, visible and infra-red wave bands, or within any one of said bands. In the preferred embodiment of the invention infra-red radiation is utilized and the thermal and radiant-energy referred to in the specifications and claims is infra-red radiation of a wavelength between 8000 and $4 \times 10^6$ angstrom units.

When the equipment is in use an optical unit scans an area and collects thermal-energy originating within said area and focusses it upon a thermal-energy sensitive unit. Situated within this unit are two similar elements or resistors composed of strips of a thermal-energy sensitive material arranged to form arms of a normally balanced bridge configuration. Thermal-energy may be focussed upon one of the strips through a window in the containing unit. The other sensitive strip is protected from impinging radiations by the housings of a containing unit. A temperature discontinuity is initiated wherever in the scanning operation an object is encountered of a different thermal diffusiveness than that of the area of scan per se. When this condition arises the amount of thermal-energy collected and focussed upon the exposed strip varies and initiates a temperature variation in the strip. This temperature variant is translated into a resistance variation in the bridge circuit causing an unbalance in the circuit, and the unbalanced condition results in a voltage variation across the bridge. This voltage variation is then amplified and fed to a recording stylus. In one particular embodiment of the invention two differently dimensioned thermal-energy sensitive elements are contained within a bolometer. The elements have different fields of view and are in focus thus permitting instantaneous switching from one value of an angular field of view to another angular field of view.

The stylus is adaptable for movement transversely across a record sheet, the stylus movement being synchronized with the movement of the scanning unit. In movement the stylus rests upon a progressively moving record sheet of chemically-treated chart paper and the amplified electrical variations reaching the stylus are recorded as a series of dots on the chart paper; the intensity of the recording of these dots being proportional to the intensity of emissions registered by the equipment. The positions of the recorded dots on the chart paper are related to the positions of heat sources initiating temperature discontinuities. In one embodiment of the invention radiant-energy sensitive strips are biased from a direct-current source the polarity of which can be changed at will by operation of a reversing switch. This feature is an advantage in that it permits the recording of hot objects against cold backgrounds, or cold objects against warm backgrounds, by changing the polarity of the circuit. Examples of thermal-energy sensitive elements commonly used in detection devices are photocells, thermocouples, thermopiles and bolometers. In the preferred embodiment of the invention a thermistor-bolometer is used as the thermal-energy sensitive unit. A bolometer is a device suitable for measuring or detecting small quantities of radiant-heat energy by means of a thermally induced change in the bolometer resistance. A thermistor-bolometer is one in which the thermal-active elements are composed of thermistor material. Thermistor-bolometers may be constructed as shown in United States Patent 2,414,792 issued January 28, 1947, to J. A. Becker, while thermistors may be manufactured as shown in United States Patent 2,414,793 issued January 28, 1947, to J. A. Becker and H. Christensen. Thermistors are thermal-sensitive and their resistance changes much more rapidly with temperature than does the resistance of metals. Some thermistors have the characteristic that over certain ranges of their current voltage relationship they act as a negative resistance, for as the current through the thermistor increases the voltage across it decreases. Thermistors of different specific resistance are also available. Suitable materials for use in their manufacture are one or more of the oxides of nickel, zinc, copper, iron or cobalt. Good results are obtained with a thermistor material comprising the combined oxides of manganese, nickel and cobalt. When installed in a bolometer thermistors usually are part of a series circuit, and are arranged as arms of a balanced network. A constant voltage is applied to this network and a certain value of current flows in the circuit. The network is unbalanced whenever the resistance of a thermistor arm changes, and the voltage variation initiated by the unbalance is fed to an amplifier. The output from the amplifier may be used to actuate recording devices.

Referring to the drawings:

FIG. 1 is a perspective of the component parts of an equipment embodying the invention;

FIG. 2 illustrates a detail of a lag mechanism used in connection with the recording of signals;

FIG. 3 is a schematic diagram of the bolometer biasing circuit, showing interchangeable thermal-energy sensitive elements and their connection to the stylus mechanism;

FIG. 4 illustrates by a schematic diagram a multi-strip bolometer system connected to a multi-stylus recording arrangement; and FIG. 5 shows a masking device for use with the multi-strip bolometer system of FIG. 4.

Referring to FIG. 1, a scanning parabolic reflector 10 is mounted for oscillation about its vertical axis upon a pivot shaft 11 and an aligned drive shaft 12. A thermistor-bolometer 13 is supported at the focal point of reflector 10 by rigid spider supports 14, 15 and 16 which extend outwardly from the periphery of the reflector. Attached to shaft 12 is a lever 17 which contacts a cam 18. Also in contact with cam 18 is an idler lever 19. Levers 17 and 19 are held against the cam 18 by means of a spring 20. Cam 18 is circular in shape and is attached to a shaft 21 in an eccentric manner as illustrated. Shaft 21 is driven through a worm reduction gear arrangement 22 by a constant speed motor 23. The operation of the motor 23 imparts, through the connecting mechanism, a sinusoidal type of motion to the reflector 10. This motion swings or oscillates the reflector about the reflector vertical axis through an angle, of about ten degrees, on each side of the reflector vertical axis. This action may be at a rate of three complete oscillations per second which amounts to a rate of scan of one hundred and twenty degrees per second. The reflector 10 also has a possible freedom of movement about the horizontal axis, for the reflector and the mechanism activating the vertical movement are contained within a gimbal arrangement 24, and the gimbal 24 is adapted for pivoting upon supporting pivot shafts 25 and 26, the outer ends of which are supported for rotational motion by vertical supporting posts 27 and 28 which may be fixed to the frame 129. The displacement of the reflector 10, through the motion of the pivoted gimbal about the horizontal axis is adjustable by means of a crank 29 which acts upon the gimbal through a worm gear mechanism 30, in conjunction with racks 31 and 32 which are pivotally connected to the gimbal at a point 33 as illustrated. The scope of this movement of the gimbal 24 may be limited by means of a variable position stop 34 which engages the lower portion of the gimbal as it swings rearwardly toward the stop 34. Mounted on the reflector drive shaft 12 is a bevel gear 35 in cooperation with a gear 36 which is attached to a shaft 37. Also attached to the shaft 37 is a gear 38 which is in engagement with a toothed-end of a two-piece rack 39. The other end of the rack 39 is in engagement with a spur gear 40. Associated with the gear 40 is another gear 41 which through a bevel gear 42 and a shaft 43 acts upon a driver pulley 44 mounted upon the shaft 43. A flexible cord belt 45 passes around the pulley 44, as well as around an idler pulley 46 which is mounted upon a shaft 47. Shafts 43 and 47 which support the pulleys 44 and 46 are supported by the equipment framework as illustrated. Attached to the belt 45 is a stylus mounting block 48 to which is attached a stylus 49. The block 48 is mounted in sliding contact on a circuit connection bar 50, and also is in sliding contact with a guide bar 51. The bars 50 and 51 are supported by the equipment framework, but are electrically insulated from the framework. The block 48 slides upon the circuit connection bar 50 within the limits determined by the positions of adjustable stops 52 and 53. The stylus 49 rests in contact on a recording chart paper 54, and is adaptable for back and forth movement across the chart paper 54. The scanning oscillations of the reflector 10 are in synchronism with the motion of the stylus 49, since the reflector oscillation movement is imparted through bevel and spur gears 35, 36 and 38 to the gear rack 39, which in turn imparts its reciprocating motion to the gear 40, which through gear 41 acts upon gear 42 which is attached to the shaft 43. The belt 45 moves in a direction at right angles to the chart paper 54, and the advancing and reversing motion of the belt is transmitted to the stylus 49. The chart paper 54 is drawn from a storage reservoir 55 past and under the stylus 49 by a roller 56. The roller 56 is actuated by a motor 57 through a gear box 58, a shaft 59, a variable speed transmission box 60, a shaft 61, and a connecting gear mechanism contained in case 62. Through a choice of speed ratios obtained in a wellknown manner in the variable speed transmission box 60, a continuously adjustable speed range of chart paper movement may be secured. The various speed ratios are controlled by a shaft 63 which connects to a chart drive speed control crank 64. The chart paper speed is adjustable by operation of the crank 64 and the chart paper speed is indicated by an indicating device 65. By means of this chart drive arrangement the speed of the chart paper is smoothly adjustable to suit various mapping conditions which involve the scanning speed, angle of tilt, altitude and the speed of an aeroplane in which the equipment may be installed. The chart paper 54 and the stylus 49 may be enclosed, if desired, within an inspection window. Since the gimbal arrangement 24 can be tilted about the horizontal axis, and since the mechanism contained within the gimbal is rigidly attached thereto, means must be provided for altering the length of the rack 39 which links the mobile mechanism within the gimbal with stationary parts of the equipment. This necessary take-up adjustment is accomplished by constructing the connecting gear rack 39 in two sections as illustrated, and by connecting the sections together by a friction sliding clutch mechanism 66. As the scanning equipment tilt angle is changed the length of the rack 39 may be adjusted through the adjustable clutch 66, to a correct length, to compensate for new tilt positions assumed by the gimbal 24.

Electrical signals from the bolometer 13 may be conducted to the recording mechanism through either of the rigid spider supports 14, 15 and 16. These supports are hollow and are adaptable for conducting wires as shown at break 67 in support 16. These spider supports may be utilized as ducts through which to lead the bolometer biasing circuit conductors. All connections may be led further through the centrally apertured pivot shaft 11 as indicated at point 68. From the pivot shaft 11 the conductors carrying signals from the bolometer may lead to an amplifier, which is not shown in this figure but the function of which shall be discussed in relation to FIG. 3. From the amplifier the signals are led to the insulated circuit-connecting bar 50, thence to the stylus block 48, and from the block to the stylus 49. From the stylus 49 the electrical signals pass through the chemically treated record sheet 54 to a plate 69 upon which the record sheet is supported. Plate 69 is grounded and the circuit is completed by a ground return.

Signals from the bolometer 13 are recorded on the chart 54 by the stylus 49 at positions corresponding to the proper azimuth point with respect to the detection system's orientation. Since there is a time lag between the instant at which a given point source is scanned by the reflector and the instant when the signal from the source activates the stylus, it is necessary to furnish the system with means to compensate for this time lag in respect to the relative positions of the reflector and the stylus. The particular time delay involved is a function of the bolometer time constant and the amplification circuit in use at a particular time. If the delay factor were not compensated for, signals from a given point source would not line up on the chart, for the signals from one scan would line up in one row and those from alternate scans in the opposite scanning direction would line up in a different row. It is to be understood that the optical unit of the system may scan the same thermal-energy source more than once, depending upon the area of a particular source. The necessary time delay may be accomplished in any suitable manner. In FIG. 2 there is shown a convenient means to compensate for the time delay in recording signals.

Referring to FIG. 2, there are shown gears 40 and 41 mounted on a shaft 70. The gear 41 is rigidly affixed to the shaft while the gear 40 is free to revolve on the shaft within the confines provided by the adjustable stops 71 and 72 which are attached to gear 40, and cooperate with the projecting arm 73 of the shaft 70. This time delay mechanism is part of the connecting mechanism described in relation to FIG. 1. By adjusting the interrelationship of the gears 40 and 41, by means of the adjusting screws 71 and 72, a proper delay feature may be obtained.

FIG. 3 shows a bolometer circuit suitable for use in an embodiment of the invention. Enclosed within a bolometer housing 74 are four thermistor strips 75, 76, 77 and 78. Within the housing 74 is a window 79, and thermal-energy may pass through this window and impinge upon the thermistor strips 76 and 77. Thermistor strips 75 and 78 are completely shielded from impinging thermal-energy by means of the bolometer housing 74. These four strips make up two independent thermal-energy sensitive units, only one unit being used at any particular time. This permits variation of the scanning operation as will presently be explained. One unit includes strips 75 and 76 while the other unit includes strips 77 and 78. Either of the units may be switched into a biasing circuit by the proper operation of button 80 in relation to the switch 81. In the circuit as illustrated with button 80 in an "out" position, the strips 75 and 76 are connected to the biasing circuit, while strips 77 and 78 are disconnected from the biasing circuit and from the amplifier input. The strips 75 and 76 are connected as illustrated so as to form arms of a bridge arrangement which includes the resistors 82 and 83. The common connection point 84 of the strips 75 and 76 is connected through a coupling condenser 85 to an amplifier 86. The other ends of the strips are connected through the switch 81 to a balanced source of direct current voltage supply. Any suitable biasing means may be utilized, but one type of circuit found convenient will be described.

The circuit arrangement to furnish a balanced source of high voltage supply to the strips 75 and 76 comprises an oscillator 87 in association with transformer coils 88, 89 and 90. The coils 88 and 90 are connected in series and are tuned by means of a condenser 91. The tuning condenser 91 is not usually set for peak tuning but is utilized as a control so as to adjust the strip voltage to a desired value in the event that strips of different lengths are used. After transformation the stepped-up oscillator voltage is rectified by a twin-diode rectifier comprising units 92 and 93. When rectification is completed the direct-current output is conducted through a reversing switch 94 and stabilizing resistors 82 and 83. A series of condensers 95, 96, 97 and 98 are connected to ground, as illustrated, between each end of the series resistors 82 and 83. These condensers receive a charge from the rectifier and in discharging furnishes a bias voltage to the sensitive strips 75 and 76. This circuit arrangement results in a minimum direct-current potential at the point 84 connecting to two strips, and to this point 84 the amplifier 86 is connected. By operation of the reversing switch 94 the polarity of the direct-current biasing voltage may be reversed and the exposed strips may be positively or negatively biased. Although a pair of independent sensitive units are shown in the drawing it will be understood that a bolometer with but one sensitive pair of strips may be utilized. By using a variety of sensitive elements, composed of thermistor strips of different lengths, different fields of views are readily obtainable. The two pairs of strips shown in the drawings are composed of thermistor material of different specific resistance. One pair of strips were manufactured from a material of from seven to eight times the specific resistance of the other pair, and a four to one strip length ratio obtained between the pairs thus providing a four to one choice in the angular height of areas scanned. Since thermal-noise energy is proportional to resistance and temperature, a resistance temperature ratio of two to one between pairs of strips will result in a three decibel change in the amount of thermal-noise. The smaller pair of strips has double the resistance of the larger pair and hence conveys a thermal-noise ratio three decibels higher than does the larger pair with the same amplification gain.

The minimum detectable radiation density from a thermal-energy point source is about $2 \times 10^{-10}$ watts per square centimeter of the scanning reflector area, at a rate of six scans per second and this power equals the heat emission from a candle at a distance of two thousand three hundred feet. At slower scanning speeds sensitivity will increase. Sensitivity figures are usually obtained by projecting radiation from a controllable thermal-energy source upon the system and then reducing the radiation-density until the indications on the chart become so weak that they are lost, or are indistinguishable from random thermal-noise signals. It will be appreciated that in order to obtain accurate mapping information important pattern forming point heat sources must produce signals larger than signals from miscellaneous thermal-noises. The over-all response of the system may be stated in terms of the signal power required to record a point source so that it may be identified from its surroundings for a large number of scans. A signal obtained from a thermal-energy point source by the short pair of strips of FIG. 3 would be about twelve decibels, or four times greater than would be obtained by using the longer strip pair. Since gain may be reduced three decibels in order to obtain the same noise background, this results in a net increase in the signal-to-noise ratio of nine decibels. Thermistor strips as used in detecting systems usually are 0.2 millimeter wide and possess a viewing angle of about 0.226 degrees for each millimeter of their length.

Referring again to FIG. 3, the equipment operates as follows: The reflector oscillates back and forth scanning an area under observation. Thermal-energy emissions are collected from the area and focussed by the reflector upon the thermistor strip 76 through the bolometer window 79. As the radiation impinges upon the strip 76 the temperature of the strip varies and initiates a corresponding change in the strip resistance in relation to that of its associated unexposed strip 75. If for example, strip 76 is heated by reason of the equipment scanning a hot object, the resistance of strip 76 will decrease rapidly. As the scan proceeds the hot object is passed and the amount of thermal-energy falling on the exposed strip decreases. This action cools the strip and causes its resistance to rise. The signal thus produced represents a positive direct-current pulse. The varying increase and decrease of the strip resistance causes a varying unbalance and balance in the bridge circuit, and initiates a voltage variation across the bridge between the point 84 and ground. This voltage variation is fed through the condenser 85 to the amplifier 86, in the form of an alternating current signal. The amplifier output is led to the stylus 99, and thence through the chemical chart paper 100 to the ground plate 101. The lateral scanning motion of the reflector in connection with the viewing dimension of the bolometer results in an advancing zigzag ribbon pattern of coverage. The recording action of the stylus and chart in conjunction with the scanning accomplished by the optical unit, results in a strip-map of temperature differentials and discontinuities encountered in the area under observation.

Referring to FIG. 4, there is shown an alternative arrangement for use in the invention. Before describing the arrangement in detail a discussion of the problem it solves will be helpful. It is necessary to employ a very small field of view in order to adequately distinguish hot small objects from larger objects with lower temperatures. To illustrate this problem the angle of one degree at a mile distance will encompass an object situated a mile from the observing point and measuring ninety-two feet in length. Now in order that a five-foot object furnish signals equal to those supplied by the ninety-two foot object, it will have to possess a temperature 92/5, or 18.4 times that of the larger object for each comparable unit of its length. This small object may be detected by recording its greater temperature per unit area against that of other surrounding, and possibly larger, objects. When the detecting equipment is used in an aeroplane at an altitude of ten thousand feet, one-tenth of a degree covers a distance of 18.4 feet on the ground below. In order to scan and cover the ground, at an air speed of three hundred miles per hour, the necessary ground scan speed would amount to a rate of four hundred and forty feet per second. If a bolometer with a single sensitive unit is utilized the scanning speed would be 440/18.4, or about twenty-four scans per second. It is possible to achieve this scan if each scan covers a twenty-degree area, and if the angular rate is four hundred and eighty, $20 \times 24$, degrees scanned per second. It will be perceived that with such a rapid scan and reasonable bolometer time constants a large loss in sensitivity will result. In the alternate bolometer arrangement of FIG. 4, the general outside dimensions of the bolometer are the same as the dimensions of the bolometer shown in FIG. 3, but the internal arrangement is different. The larger sensitive unit of FIG. 3 is .5 millimeter long by .2 millimeter wide and has an angle of view of .11 degree. In the alternative arrangement of FIG. 4 twelve sensitive units are positioned in stepped fashion. This multi-step arrangement results in a total ground coverage of 1.2 degrees amounting to two hundred and eighteen feet per scan at an altitude of ten thousand feet. A scanning rate of two scans per second at this altitude will cover the ground at an air speed of three hundred miles per hour. To assure maximum effectiveness a minimum of two sweeps or scans should be accorded to each object viewed, and this coverage may be achieved by the multi-strip bolometer arrangement at a rate of four scans per second.

The alternative method of obtaining necessary information at a faster rate of speed will now be described in detail.

Referring to FIG. 4 the bolometer 102 is provided with a window 103 which may be composed of any suitable material. If it is desired that infra-red radiations should pass, the window may be a sheet of silver-chloride. To exclude ultra-violet radiations a thin coating of gilsonite may be applied over the silver-chloride sheet without impairing its transmission properties in the infrared band. To exclude visible lights the silver-chloride may be coated with silver-sulphide. Back of the window 103 a plurality of dual unit sensitive elements 104, 105, 106, 107, 108 and 109 are situated. These elements are positioned in stepped arrangement and comprise a series of independent but mutually cooperating dual units of the type discussed in relation to FIG. 3. It will be appreciated that these elements may be arranged in stepped fashion as illustrated, or disposed in any convenient manner such as in a vertical or horizontal arrangement. The element plurality may comprise any suitable number of elements. These dual independent units are interconnected as illustrated, and may be biased from a unidirectional but reversible direct-current source such as has been described and illustrated in relation to the arrangement shown in FIG. 3. Spaced upon a supporting bar 110 are a number of stylus blocks upon which are secured styluses 111, 112, 113, 114, 115 and 116. The stylus blocks are composed of a suitable insulating material so as to insulate the styluses from the bar 110 and also from each other. The styluses move supported on the stylus blocks in a back and forth movement upon the bar 110 and on a guide bar 117 actuated by a belt 118 to which the blocks are attached, the manner in which the belt actuates the styluses being similar to that described in relation to FIG. 1. Electrical circuit connections to the styluses are completed from circuit connecting bars 119, 120, 121, 122, 123 and 124 through sliding spring contacts to the styluses as illustrated. The other mechanical mechanisms used with this embodiment of the invention are not shown in FIG. 4, but are identical with those described in connection with FIG. 1. The output of each independent thermal-energy sensitive unit may be fed through a coupling condenser to a respectively connected amplifier, and the amplifier output rectified and led to a circuit connecting bar, thence to a respectively associated stylus point, each circuit being completed from a stylus point through the chemically treated chart paper to a ground plate as discussed in relation to FIG. 1.

Referring to FIG. 5, there is shown a mask arrangement for use with the multi-strip bolometer shown in FIG. 4, and comprising a frame made from metal or other suitable material having a series of openings 130, 131, 132, 133, 134 and 135 situated therein. Spring clips 136 are adapted for cooperation with the clip receptacles 137 in the bolometer housing 102 of the configuration shown in FIG. 4, and hold the mask securely against the bolometer housing. When the mask is in position against the housing each alternate strip of the plurality of sensitive dual units is obscured and shielded by the mask from external radiation. It will be understood that the mask may be rearranged to mask alternate strips in the various possible arrangements of sensitive units discussed above.

Referring again to FIG. 4, the arrangement shown thereon operates in a similar manner to that discussed in relation to FIGS. 1, 2 and 3. The use of a full wave rectifier is however necessary in this arrangement. In the circuit of FIG. 3, although an alternating current signal reaches the stylus but one-half of the signal is utilized in recording upon the chart, and the chart paper may be said to be unidirectional in the sense that but one part of the signal pulse is recorded thereon. When the multi-strip dual element bolometer is utilized a full wave rectifier is used for each alternate element of each individual dual unit of the bolometer arrangement is of opposite polarity. Since all these elements are exposed to radiation recording uniformity is desirable. When all the strips of the multi-strip arrangement are exposed signals received from large objects tend to substantially balance out and do not record, for the image of a large object tends to impinge upon each element of a dual unit at the same time, and accordingly the biasing bridge circuit remains in balance. The equipment high resolving power for small objects is retained, for a small emission source would tend to impinge upon but one strip, and by doing so would originate a signal indication. Blind spot strip edge effect may be substantially eliminated by a slight overlapping of the thermistor strips. In this embodiment of the invention the angular displacement of the strips is compensated for by the arrangements of the recorder styluses. For example, at an altitude of ten thousand feet the ground distance for a twenty-degree scan is a little less than four thousand feet. If this scan is to be recorded on a chart of six inches width the two hundred and eighteen feet representing one scan totals 1.2 degrees, and represents about .33 inch for undistorted dimensional presentation. Accordingly, the six styluses used in this embodiment of the invention may be spaced about sixty-five mils apart upon the circuit connection bar. The styluses must be arranged in their relationship to the recording chart in proportion laterally and longitudinally with the particular bolometer configuration utilized. When the mask arrangement is used all of the exposed thermistor strips are of the same polarity, and it is not necessary to use a full-wave rectifier in the recording circuit. When the mask is in position on the bolometer large emission sources will originate signals.

When the invention is used in an aeroplane the settings of the chart speed and the tilt of the gimbal mechanism may be readily calculated to conform to varying plane speeds and altitudes for different conditions of coverage, and ready reference tables showing the relationship of tilt, speed and altitude may be evolved. The equipment may be used with a gyro stabilized platform so as to hold the system position constant to a small fraction of a degree during mapping.

The amplifier as used in the invention is such as can readily be designed by those skilled in the art. The amplifier should be situated as near as possible to the bolometer so as to reduce the high impedance lead length, and amplifier tubes should be carefully selected so as to obtain tubes that are comparatively noise free. While in the particular embodiment of the invention shown an alternating-current amplifier is used it will be appreciated that a stabilized direct-current amplifier may be utilized.

It is to be understood that the methods systems and instrumentalities herein described and illustrated are for illustrative purposes, and that modifications in design, arrangement and procedure may be substituted without departing from the spirit of this invention.

What is claimed is:

1. A system for detecting the position of thermal-energy sources by means of temperature differentials existing between said sources and their surroundings, comprising a thermal-energy sensitive element, means for collecting thermal-energy from within an area under observation and directing it upon said element, a source of unidirectional energizing current connected by circuit means to said element, means in said circuit whereby a transient voltage variation is initiated by a transient change in the amount of thermal-energy impinging upon said element, recording means, including a stylus and chart, for recording said voltage variations at positions upon said chart relative to the position of a source initiating said transient change with respect to said collecting means, means for causing said stylus to record said variations with intensities of recording proportional to the relative intensities of said source initiating said variations, means in said circuit for reversing the direction of flow of said current at will, whereby the recording of thermal-energy sources with colder surroundings is favored when said current is in one direction and the recording of thermal-energy sources with warmer surroundings is favored when said current is in the opposite direction.

2. In a thermal-energy emission system for detecting and recording the bearings of thermal-energy emission sources with respect to said system and producing a map depicting the position of said sources relative to a datum line on said map, the combination of a plurality of thermal-energy sensitive elements, said elements coupled into a series of independent dual units, means for collecting thermal-energy and directing it upon said elements, a recording device individual to each dual unit, an indication circuit individual to and including each device and unit, means to actuate a device whenever the amount of thermal-energy received by its associated element varies, said device recording said variations at positions upon said map related to the bearing of the thermal-energy source initiating said variations and said datum line.

3. A system according to claim 1 in which there is provided a vehicle for supporting said detecting and recording means and moving them with respect to said area, means for adjusting the rate of movement of said sensitized surface to compensate for varying speeds of said vehicle.

4. An aerial mapping system comprising thermal-energy sensitive means, a source of unidirectional current connected to said sensitive means, means for collecting thermal-energy radiations from an area and directing them upon said thermal-energy sensitive means, thermal-energy mapping means, said mapping means comprising a continuously moving sensitized surface upon which a map is to be produced, marking means for producing a sign at any point on said continuously moving sensitized surface, means for repeatedly moving said marking means in a reciprocating motion across said moving sensitized surface, the position of said marking means at any instant being representative of the relative position of said system with respect to thermal-energy sources from which radiation is being collected, means for initiating electrical pulses in accordance with variations in the intensities of collected thermal-energy radiations, means for supporting and moving said system, means under control of said electrical pulses for causing said marking means to produce signs on said continuously moving sensitized surface and means for reversing the direction of flow of said current whereby the recording of thermal energy sources with colder surroundings is favored when the current is in one direction and the recording of thermal sources with warmer surroundings is favored when the current is in the opposite direction.

References Cited in the file of this patent

UNITED STATES PATENTS

| | | |
|---|---|---|
| 2,127,889 | Shenk et al. | Aug. 23, 1938 |
| 2,177,061 | Gerhard | Oct. 24, 1939 |
| 2,186,948 | Alder | Jan. 16, 1940 |
| 2,234,328 | Wolff | Mar. 11, 1941 |
| 2,305,396 | Volochine | Dec. 15, 1942 |
| 2,412,165 | McDermott | Dec. 3, 1946 |
| 2,423,023 | Hershberger | June 24, 1947 |
| 2,430,283 | Epstein | Nov. 4, 1947 |
| 2,430,307 | Smith | Nov. 4, 1947 |
| 2,435,960 | Fyler | Feb. 17, 1948 |
| 2,442,823 | Polye | June 8, 1948 |
| 2,467,120 | Evans | Apr. 12, 1949 |
| 2,507,863 | Mesh | May 16, 1950 |
| 2,539,553 | Rich | Jan. 30, 1951 |
| 2,562,538 | Dyer | July 31, 1951 |

FOREIGN PATENTS

| | | |
|---|---|---|
| 813,404 | France | June 1, 1937 |